United States Patent [19]

Miyazono et al.

[11] Patent Number: 5,159,017
[45] Date of Patent: Oct. 27, 1992

[54] CROSSLINKED POLYMER MICROPARTICLES AND COATING COMPOSITION CONTAINING THE SAME

[75] Inventors: Tadafumi Miyazono; Akio Kashihara, both of Osaka; Shinichi Ishikura, Kyoto, all of Japan

[73] Assignee: Nippon Paint Co., Ltd., Osaka, Japan

[21] Appl. No.: 628,997

[22] Filed: Dec. 18, 1990

Related U.S. Application Data

[60] Continuation of Ser. No. 211,127, Jun. 21, 1988, abandoned, which is a division of Ser. No. 3,715, Jan. 15, 1987, abandoned.

[51] Int. Cl.$^5$ .................. C08G 71/00; C08K 5/01; C08K 5/06; C08K 5/07
[52] U.S. Cl. .................. 525/123; 525/509; 525/518; 525/519; 525/452; 524/284
[58] Field of Search .............. 524/284; 525/509, 518, 525/519, 123, 452

[56] References Cited

U.S. PATENT DOCUMENTS

| | | | |
|---|---|---|---|
| 3,356,627 | 12/1967 | Scott | 524/521 |
| 3,617,361 | 11/1971 | Reinhard et al. | 524/521 |
| 4,049,483 | 4/1977 | Loder et al. | 524/521 |
| 4,075,144 | 2/1978 | Frisque et al. | 524/521 |
| 4,414,357 | 11/1983 | Wright et al. | 524/513 |
| 4,468,493 | 8/1984 | Ishikura et al. | 524/513 |
| 4,539,348 | 9/1985 | Gajria et al. | 524/508 |
| 4,598,111 | 7/1986 | Wright et al. | 524/513 |
| 4,624,973 | 11/1986 | Kuwajima et al. | 524/513 |
| 4,743,653 | 5/1988 | Numata et al. | 525/512 |

*Primary Examiner*—James J. Seidleck
*Assistant Examiner*—W. R. H. Clark
*Attorney, Agent, or Firm*—Wenderoth, Lind & Ponack

[57] ABSTRACT

Novel crosslinked polymer microparticles having a mean grain diameter of 0.01 to 10$\mu$, whose polymer carries urea, urethane or amide groups. The invention also provides a coating composition containing said crosslinked polymer microparticles, which is excellent in application characteristics and storage stability and is capable of providing a coating with excellent film properties.

4 Claims, No Drawings

CROSSLINKED POLYMER MICROPARTICLES AND COATING COMPOSITION CONTAINING THE SAME

This application is a continuation application of now abandoned application Ser. No. 07/211,127 filed Jun. 21, 1988, which is a division of now abandoned application Ser. No. 07/003,715 filed Jan. 15, 1987.

FIELD OF THE INVENTION

The present invention relates to novel crosslinked polymer microparticles having a mean grain diameter of 0.01 to 10$\mu$, whose polymer carries urea, urethane or amide groups. The invention also concerns a coating composition containing said crosslinked polymer microparticles, which is excellent in application characteristics and storage stability and is capable of providing a coating with excellent film properties.

BACKGROUND OF THE INVENTION

Recently, crosslinked polymer microparticles have been watched with keen interest in paint industries as a prominent additive for various paints, as, for example, rheological regulator, filler, modifier or the like in aqueous coating compositions, high solid paints, powder coating compositions and the like. However, heretofore proposed microparticles are only of crosslinked polymer having no functional groups or at most of crosslinked polymer bearing carboxyl, hydroxyl or amino groups. Introduction of such functional groups to the crosslinked polymer is believed to be beneficial in obtaining an improved curability of a coating composition compounded with an aminoplast resin or polyisocyanate compound, or improved dispersibility of the polymer microparticles per se or pigment particles in a coating composition. On the other hand, there is a class of functional groups having relatively higher cohesive energy of atomic groups (Burn et al., J. Chim. Phys. 16, 323 (1955)) e.g. urea, urethane, amide groups and the like. However, a polymerizable monomer bearing such group is in general of high crystallinity and is hardly soluble in other copolymerizable monomers or solvents, and thus considerable difficulties are encountered in the actual handling of such monomer. Moreover, even if resinous particles bearing such functional groups be provided, it would be most probable that the particles are easily associated or agglomerated together due to the presence of said groups with higher cohesive energy. Such properties are undesirable for the polymer microparticles to be compounded with a coating composition, and in fact, no such particles have been prepared and used in the related technical fields. In the paint industry, there is a firm demand for obtaining a high solid coating composition having improved application characteristics and storage stability, capable of providing a coating with far improved coating appearance, and for developing a new type polymer microparticles to be compounded with such composition. It is, therefore, an object of the invention to provide novel crosslinked polymer microparticles which can be used in various paints including aqueous coating compositions, high solid coating compositions, powder coating compositions and the like, to improve film-forming properties of said paints. An additional object of the invention is to provide a high solid coating composition containing such polymer microparticles, which is excellent in application characteristics and storage stability, and is capable of providing a coating with far improved appearance and especially gloss and sharpness.

SUMMARY OF THE INVENTION

The inventors have surprisingly found that crosslinked polymer microparticles bearing urea, urethane or amide groups are indeed liable to associate or agglomerate together, but the agglomerated mass is easily dissociated to the primary microparticles by the application of mechanical force or thermal energy, and that the said polymer microparticles are stably dispersed in a dispersion medium in the presence of a polar solvent having a strong hydrogen bond or other substance having a higher cohesive energy, due to the interfacial interaction with said solvent or substance. By the adoption of such polymer microparticles, it is possible to formulate a high solid coating composition which is excellent in storage stability and application characteristics and which can result a coating with far better film appearance. On the basis of these findings, the invention has been made.

Thus, in accordance with the present invention, the aforesaid objects of the invention can be fully attained with crosslinked polymer microparticles having a mean grain diameter of 0.01 to 10$\mu$ and bearing urea, urethane or amide groups.

PREFERRED EMBODIMENTS OF THE INVENTION

The present crosslinked polymer microparticles may be of any polymers including condensation polymers such as polyester resin, alkyd resin, epoxy resin, melamine resin and the like, and addition polymers such as acrylic resin and the like, providing they have urea, urethane or amide groups and are in microparticle form of 0.01 to 10$\mu$ size. Such microparticles may be prepared by using various methods well known to those skilled in the art. For example, crosslinked acrylic resin microparticles may be prepared by an emulsion polymerization or NAD method, by polymerizing $\alpha,\beta$-ethylenically unsaturated monomer having urea, urethane or amide group alone or with other copolymerizable monomers, as well as a crosslinking monomer having two or more polymerizable ethylenic bonds. Alternatively, hydroxyl bearing crosslinked acrylic resin particles are reacted with an organic isocyanate, and if desired, thus obtained microparticles are further reacted with a monoalcohol or monoamine compound. It is also possible to prepare composite resin microparticles comprising crosslinked acrylic resin body portion and a number of linear acrylic polymer chains bearing urea, urethane or amide groups, a part of the respective polymer chain penetrating into said body portion and the remaining part extending outwardly therefrom, by effecting solution polymerization of $\alpha,\beta$-ethylenically unsaturated monomer bearing urea, urethane or amide group and other chain constituting monomer in the presence of said crosslinked acrylic resin particles which will constitute the body portion of the respective composite resin particle. As the $\alpha,\beta$-ethylenically unsaturated monomers having urea, urethane or amide groups, use can be made of the following. Examples of urea bearing monomers are reaction products of isocyanate ethyl (meth) acrylate or (meth) acryloyl isocyanate with monoamines. As the monoamines, mention is made of benzylamine, ethylamine, n-propylamine, sec-propylamine, n-butylamine, sec-butylamine, t-butylamine, n-pentylamine, $\alpha$methyl butylamine, $\alpha$-ethyl propylamine, β-ethyl butylamine, γ-methyl butylamine and the like. Among them, particular preference is given to the members having 1 to 4 aliphatic carbon atoms as, for example, benzylamine, propylamine, t-butylamine and the like. Hydroxyl monoamines are also appropriate. Examples are such monohydroxy monoamines as 2-aminoethanol, 1-aminoethanol, 2-aminopropanol, 3-aminopropanol, 1-amino-2-propanol, 2-amino-2-methyl propanol, 2-aminobutanol and 5-aminopentanol, and such polyhydroxy-monoamines as 2-amino-2-methyl-1,3-propanediol and 2-amino-2-ethyl-1,3-propanediol and the like. Especially useful is 2-aminoethanol. It is also possible to use, as monoamine component, a mixture of at least one monoamine and at least one monohydroxy-monoamine and/or polyhydroxy monoamine. Examples of urethane bearing monomers are reaction products of isocyanate ethyl (meth) acrylate or (meth) acryloyl isocyanate and monoalcohol, including benzyl alcohol, methanol, butanol, amyl alcohol, hexyl alcohol, octyl alcohol, 2-ethyl hexyl alcohol and the like; and reaction products of hydroxy bearing (meth) acrylate ( e.g. 2-hydroxyethyl (meth) acrylate, hydroxypropyl (meth) acrylate, 4-hydroxybutyl (meth) acrylate and their addition products with ε-caprolactone) and said monoisocyanate compound. Examples of amide bearing monomers are N,N-dimethylaminopropyl methacrylamide, (meth)acrylamide, N-methylol acrylamide, N-butoxymethyl acrylamide, N-methoxymethyl acrylamide, N-isopropylaminopropyl (meth) acrylamide, diacetone (meth) acrylamide and the like. Other copolymerizable monomers optionally used together with said urea, urethane or amide bearing α,β-ethylenically unsaturated monomer are, for example, esters of acrylic acid, methacrylic acid, itaconic acid, maleic acid, fumaric acid or the like; styrene, vinyl toluene, acrylonitrile, vinyl acetate and the like. Particularly preferable members are the reactive esters of the formula:

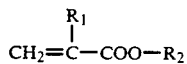

wherein $R_1$ is hydrogen or methyl group; and $R_2$ is a saturated hydrocarbon having 1 to 15 carbon atoms and hydroxy containing derivative thereof. Examples are methyl acrylate, methyl methacrylate, butyl acrylate, butyl methacrylate, 2-ethylhexyl acrylate, 2-ethylhexyl methacrylate, lauryl acrylate, lauryl methacrylate, 2-hydroxypropyl acrylate, 2-hydroxypropyl methacrylate, 2-hydroxyethyl acrylate, 2-hydroxyethyl methacrylate and the like.

For crosslinking purpose, at least one α,β-ethylenically unsaturated monomer having 2 or more polymerizable ethylenic bonds (hereinafter called polyfunctional monomer or crosslinking monomer) is used as a monomer component. Examples of such monomers are ethyleneglycol diacrylate, ethyleneglycol dimethacrylate, triethyleneglycol dimethacrylate, tetraethyleneglycol dimethacrylate, 1,3-butyleneglycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetracrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxymethylethane diacrylate, 1,1,1-trishydroxymethylethane triacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimellitate, diallyl terephthalate, diallyl phthalate, divinyl benzene and the like. It is also possible to use two different α,β-ethylenically unsaturated monomers each having mutually reactive functional groups for said crosslinking purpose. Examples of such combination of functional groups are epoxy and carbonyl groups; epoxy and acid anhydride groups; amine and carbonyl groups; amine and acid chloride groups; alkyleneimine and carbonyl groups; organoalkoxysilane and carboxyl groups; hydroxyl and isocyanate groups and the like.

The aforesaid monomers are polymerized in a conventional way in the presence or absence of reaction medium and using a polymerization initiator, chain transfer agent or the like. Crosslinked polyester or alkyd resin microparticles bearing urea or urethane groups may be prepared as follows.

That is, an alkyd resin having unsaturated fatty acid groups or a polyester resin modified with a maleic anhydride, allyl glycidyl ether, glycidyl methacrylate or the like and having polymerizable unsaturated bonds is first dispersed in water in the presence or absence of an appropriate emulsifier, and then styrene and radical initiator are added and heated to obtain crosslinked alkyd or polyester resin particles.

Next, the thus formed and separated resin particles are, after drying and pulverizing as desired, reacted with an isocyanate compound to obtain urethane bearing crosslinked polymer microparticles. Urea bearing microparticles may be obtained by the reaction of said urethane bearing microparticles with a primary or secondary amine. Urethane or urea bearing crosslinked melamine resin microparticles may be prepared as follows. That is, crosslinked melamine resin particles are first prepared by making use of self-condensation of methylol groups possessed by melamine resin. For example, a melamine resin having a relatively larger quantity of methylol groups is dispersed in water in the presence of an appropriate emulsifier, a catalyst is added and the mixture is heated to obtain crosslinked melamine resin particles. Thus formed particles are separated, dried and pulverized. Thereafter, the crosslinked melamine resin microparticles thus obtained are dispersed in an organic solvent having no active hydrogen and reacted with an isocyanate compound and further with a primary or secondary amine as desired to obtain urethane or urea bearing crosslinked melamine resin microparticles. Urethane or urea bearing crosslinked epoxy resin microparticles may be prepared as follows. That is, crosslinked epoxy resin particles are first prepared by the reaction of polyfunctional epoxy resin having 2 or more epoxy groups and a polyfunctional amine or amide having in its molecule 2 or more primary or secondary amine groups. For example, said polyfunctional epoxy resin is dispersed in water in the presence of an appropriate emulsifier and said polyfunctional amine is added and reacted to obtain crosslinked epoxy resin particles. The formed particles are separated, dried and pulverized. Next, the crosslinked epoxy resin microparticles are dispersed in an organic solvent having no active hydrogen and reacted with an isocyanate compound and further with a primary or secondary amine to obtain urethane or urea bearing crosslinked epoxy resin microparticles.

In the abovesaid reactions, as an isocyanate compound, the following may be satisfactorily used: organic monoisocyanates such as butyl isocyanate, stearyl isocyanate, phenyl isocyanate, cyclohexyl isocyanate and the like; and organic diisocyanates such as tetramethylene-1,4-diisocyanate, hexamethylene-1,6-diisocyanate, isophorone diisocyanate and the like. As the primary or secondary amine, any of the organic amines known to be useful in the reaction with a carbonyl group may be satisfactorily used.

Particle size of thus formed resin particles may vary with the preparation method used. In general, an emulsion polymerization technique may give the desired microparticles having a mean diameter of 0.01 to 10μ. However, one may use any known technique for the preparation of the crosslinked polymer microparticles of this invention and if the formed particles are too large, they may be separated and pulverized to obtain the microparticles of the defined size. As already stated, the present crosslinked polymer microparticles are characterized by having urethane, urea or amide groups in the molecule of said polymer. Since the said groups are of higher cohesive energy nature, they are easily associated or agglomerated with a substance with high cohesive energy. However, thus bound substance is easily dissociated or released out by the influence of thermal energy or a highly polar solvent. These properties are very important for the present crosslinked polymer microparticles in the actual use thereof. In the case of conventional resin microparticles having no such groups, when they are added to a solvent type coating composition, the storage stability and application characteristics of thus obtained composition are rather poor because of its insufficient interfacial interactions between the particles and solvent and between the particles and soluble type resinous material contained therein, and there often results a coating with inferior coating appearance. This may be due to the fact that the added microparticles agglomerate into a number of discrete masses in the coating composition in storing or film-forming stage and thus formed masses remain in the baked film in the final stage, thereby lowering the gloss and sharpness of the formed coating. Whereas, in the present invention, though the polymer microparticles are liable to be associated or agglomerated together due to the presence of such groups as urethane, urea or amide groups having a higher cohesive energy, such agglomerated particles are easily dissociated into the primary microparticles by the influence of a polar solvent having a strong hydrogen bond, and when the present microparticles are used together with a substance with a higher cohesive energy or a soluble type resinous material, they are absorbed to said substance or resinous material and maintained in a stabilized form of dispersion in a coating composition. For this reason, the application characteristics and storage stability of the thus obtained composition are greatly improved. Furthermore, even when the present polymer microparticles are associated or agglomerated together in the storage or film-forming stage, thus agglomerated masses may be easily dissociated into the primary particles by thermal energy given in the baking stage, and therefore, the formed coating is far more excellent in gloss and smoothness as compared with those of the coatings of heretofore proposed coating compositions.

The inventors have also found that the aforesaid advantageous effects are eminently materialized with the crosslinked polymer microparticles having $1 \times 10^{-3}$ mole or more urea, urethane or amide groups per 100 g of the polymer and that further improvement in gloss and sharpness of the coating can be obtained with the present polymer microparticles having the group represented by the formula:

$$-NH-Y-Z$$

wherein Y stands for —CONH—, —COO— or —CO—; and Z is phenyl or hydroxyalkyl group.

In the second aspect of the invention, there is provided a coating composition comprising
(A) a film-forming polymer
(B) a volatile organic liquid diluent carried in the form of solution or dispersion with said film-forming polymer, and (C) crosslinked polymer microparticles which are insoluble in the combination of said film-forming polymer and diluent and stably dispersed therein, which is characterized in that said crosslinked polymer microparticles have a mean grain diameter of 0.01 to 10μ, whose polymer carries urea, urethane or amide groups.

The film-forming polymer (A) used in the present coating composition may be any members customarily used in a solvent type coating composition and having a film-forming property which includes acrylic resin, alkyd resin, oil-free-polyester resin, epoxy resin and their modified resins. They may carry such functional groups as hydroxyl, carboxyl and the like and their acid value, hydroxyl value and number average molecular weight are, in general, 0.5 to 60, 20 to 200 and 500 to 10,000, respectively. However, these should not be taken as limitative in any sense and any polymers may be freely used, providing they have a film-forming property and are soluble or dispersible in a liquid medium as defined in (B).

The solid weight ratio of (A):(C) in the coating composition is preferably 50 to 99.5:50 to 0.5.

As the volatile organic liquid diluent (B), use can be made of any members customarily used in an organic solvent type coating composition. Examples are aromatic hydrocarbons such as toluene, xylene, aromatic containing petroleum cut and the like; esters such as butyl acetate, ethyleneglycol diacetate, 2-ethoxyethyl acetate and the like; ketones such as acetone, methylisobutyl ketone and the like; alcohols such as butyl alcohol and the like; ethers; aliphatic hydrocarbons and mixtures thereof.

In the present coating composition, as the most characteristic feature thereof, novel polymer microparticles (C) are contained in the form of stable dispersion in the combination of abovesaid film-forming polymer and volatile organic liquid diluent. The said polymer microparticles (C) are, as already stated in connection with the first aspect of the invention, crosslinked polymer microparticles having a mean grain diameter of 0.01 to 10μ, whose polymer carries urea, urethane or amide groups. Since the defined groups are of high cohesive energy nature and are possessed of other substance carrying function, the present polymer microparticles do exhibit marked interfacial interactions between the said particles and the liquid diluent and between the said particles and the film-forming polymer. Therefore, in the present coating composition, said polymer microparticles are maintained in the form of stable dispersion in the combination of the aforesaid volatile organic liquid diluent and the film-forming polymer, and thus obtained composition can exhibit an improved application property. Furthermore, even if the contained microparticles are associated or agglomerated together to some extent in a film-forming stage, thus formed agglomerates are easily dissociated into the primary particles by the influence of thermal energy and therefore, they disappear at the baking stage, resulting in a coating with excellent gloss and surface smoothness, after all. Therefore, in a preferable embodiment of the invention, a curing agent such as an aminoplast resin or a polyisocyanate compound is additionally added and the composition is used as a baking type coating composition. In either embodiment, i.e. air drying type or baking type composition, the present coating composition can exhibit excellent storage stability and application characteristics, and result in a coating with far improved coating appearance and especially gloss, smoothness and sharpness, as compared with those of the heretofore proposed similar materials. The invention shall be now more fully explained in the following Examples. Unless otherwise stated, all parts and percentages are by weight.

REFERENCE EXAMPLE 1

Preparation of emulsifier having amphoionic group

Into a 2 liter reaction vessel fitted with a stirrer, a nitrogen gas inlet tube, a thermoregulator, a condenser and a decanter, were placed 134 parts of bishydroxyethyl taurine, 130 parts of neopentylglycol, 236 parts of azelaic acid, 186 parts of phthalic anhydride and 27 parts of xylene and the mixture was heated while removing the formed water azeotropically. The inner temperature was raised to 190° C. in about 2 hours from the commencement of reflux and thereafter, the reaction was continued at the same temperature, while keeping stirring and dehydration, until the carboxylic acid equivalent acid value of the reaction product reached 145. The reaction mixture was then allowed to cool to 140° C. and while maintaining the same temperature 314 parts of Cardura E-10 (glycidyl versatate, trademark of Shell Chem. Co.) were dropwise added, and the mixture was stirred for 2 hours to complete the reaction. Thus obtained polyester resin had an acid value of 59, a hydroxyl value of and a number average molecular weight of 1054.

REFERENCE EXAMPLE 2

Preparation of urea bearing monomer

Into a 500 ml reaction vessel fitted with a stirrer, a condenser and a thermoregulator, were placed 155 parts of isocyanate ethyl methacrylate (manufactured by Dow Chem. Co.) and while maintaining the inner temperature at 20° C. and continuing stirring, a mixture of 107 parts of benzyl alcohol, 0.2 part of hydroquinone monomethyl ether and 65 parts of chloroform was dropwise added thereto in 15 minutes. Thereafter, the combined mixture was further stirred for 30 minutes and after confirming the complete disappearance of NCO absorption band in an infra-red spectrophotometric analysis, the solvent was distilled off under reduced pressure to obtain the desired urea bearing monomer.

REFERENCE EXAMPLE 3

Preparation of urea bearing monomer

Into a similar reaction vessel as used in Reference Example 2, were placed 155 parts of isocyanate ethyl methacrylate and while continuing stirring and maintaining the temperature at 20° C., a mixture of 61 parts of 2-amino-1-ethanol, 0.2 part of hydroquinone monomethylether and 65 parts of chloroform was dropwise added in 15 minutes. Thereafter, the mixture was stirred for 30 minutes and after confirming the complete disappearance of NCO absorption band in an infra-red spectrophotometric analysis, the solvent was removed off under reduced pressure to obtain the desired urea bearing monomer.

REFERENCE EXAMPLE 4

Preparation of urethane bearing monomer

Into a similar reaction vessel as used in Reference Example 2, were placed 155 parts of isocyanate ethyl methacrylate, 0.2 part of dibutyl tin dilaurate and 108 parts of benzyl alcohol, and the mixture was heated to 80° C. under stirring, and maintained under the same conditions for 2 hours. After confirming the complete disappearance of NCO absorption band in an infra-red spectrophotometric analysis, the desired urethane bearing monomer was obtained.

REFERENCE EXAMPLE 5

Preparation of urethane bearing monomer

The similar procedures as stated in Reference Example 4 were repeated with the following materials.
130 parts of 2-hydroxyethyl methacrylate
0.2 part of hydroquinone monomethyl ether
0.2 part of dibutyl tin dilaurate
119 parts of phenylisocyanate
The desired urethane bearing monomer was obtained.

EXAMPLE 1

Into a 1 liter reaction vessel fitted with a stirrer, a condenser and a thermoregulator, were placed 245 parts of deionized water, 15 parts of amphoionic group bearing emulsifier obtained in Reference Example 1 and 1.5 parts of dimethyl ethanolamine, and the mixture was heated to 80° C. under stirring to obtain a clear solution. To this, were simultaneously and dropwise added a solution of 1 part of azobiscyanovaleric acid in 20 parts of deionized water added with 0.7 part of dimethyl ethanolamine, and a monomer mixture of 35 parts of styrene, 35 parts of ethyleneglycol dimethacrylate, 26 parts of n-butyl acrylate and 4 parts of the urea bearing monomer obtained in Reference Example 2 in 60 minutes, and the combined mixture was stirred for additional 90 minutes to obtain a dispersion of crosslinked polymer microparticles. The solid content of said dispersion was 30% and the mean diameter of said microparticles (determined by a laser beam scattering method) was 90 nm. By subjecting the dispersion to a spray drying, urea bearing crosslinked polymer microparticles were obtained.

EXAMPLE 2

Into a 1 liter reaction vessel fitted with a stirrer, a condenser and a thermoregulator, were placed 245 parts of deionized water, 15 parts of the amphoionic group bearing emulsifier obtained in Reference Example 1 and 1.5 parts of dimethyl ethanolamine, and the mixture was heated to 80° C. under stirring to obtain a clear solution. To this, were simultaneously and dropwise added a solution of 1 part of azobiscyanovaleric acid in 20 parts of deionized water added with 0.7 part of dimethyl ethanolamine, and a monomer mixture of 35 parts of styrene, 35 parts of ethyleneglycol dimethacrylate, 26.7 parts of n-butyl acrylate and 3.3 parts of urea bearing monomer obtained in Reference Example 3 in 60 minutes, and the combined mixture was stirred for additional 60 minutes to obtain a dispersion of crosslinked polymer microparticles. The solid content of said dispersion was 30% and the mean diameter of the contained microparticles was 92 nm. The said dispersion was then subjected to a spray drying to obtain urea bearing crosslinked polymer microparticles.

EXAMPLE 3

Into a 1 liter reaction vessel fitted with a stirrer, a condenser and a thermoregulator, were placed 245 parts of deionized water, 15 parts of amphoionic group bearing emulsifier obtained in Reference Example 1 and 1.5 parts of dimethyl ethanolamine, and the mixture was heated to 80° C. under stirring to obtain a clear solution. To this, were simultaneously and dropwise added a solution of 1 part of azobiscyanovaleric acid in 20 parts of deionized water added with 0.7 part of dimethyl ethanolamine, and a monomer mixture of 35 parts of styrene, 35 parts of ethyleneglycol dimethacrylate, 26 parts of n-butyl acrylate and 4 parts of urethane bearing monomer obtained in Reference Example 4 in 60 minutes, and the combined mixture was stirred for additional 90 minutes to obtain a dispersion of crosslinked polymer microparticles. The solid content of said dispersion was 31% and the mean diameter of the contained microparticles was 90 nm. The said dispersion was then subjected to a spray drying to obtain urethane bearing crosslinked polymer microparticles.

EXAMPLE 4

Into a 1 liter reaction vessel fitted with a stirrer, a condenser and a thermoregulator, were placed 490 parts of deionized water, 30 parts of amphoionic group bearing emulsifier obtained in Reference Example 1 and 3 parts of dimethyl ethanolamine, and the mixture was heated to 80° C. under stirring to obtain a clear solution. To this, were simultaneously and dropwise added a solution of 2 parts of azobiscyanovaleric acid in 40 parts of deionized water added with 1.4 parts of dimethyl ethanolamine, and a monomer mixture of 70 parts of methyl methacrylate, 70 parts of ethyleneglycol dimethacrylate, 52.5 parts of n-butyl acrylate and 7.6 parts of urethane bearing monomer obtained in Reference Example 5 in 60 minutes, and the combined mixture was stirred for additional 90 minutes to obtain a dispersion of crosslinked polymer microparticles. The solid content of said dispersion was 30% and the mean diameter of the contained microparticles was 90 nm. The said dispersion was then subjected to a spray drying to obtain urethane being crosslinked polymer microparticles.

EXAMPLE 5

Into a 1 liter reaction vessel fitted with a stirrer, a condenser and a thermoregulator, were placed 237 parts of deionized water, 15 parts of amphoionic group bearing emulsifier obtained in Reference Example 1 and 1.5 parts of dimethyl ethanolamine, and the mixture was heated to 80° C. under stirring to obtain a clear solution. To this, were simultaneously and dropwise added a solution of 1 part of azobiscyanovaleric acid in 20 parts of deionized water added with 0.7 part of diethyl ethanolamine, a solution of 1.1 parts of acrylamide in 8 parts of deionized water and a monomer mixture of 35 parts of styrene, 35 parts of ethyleneglycol dimethacrylate and 28.9 parts of n-butyl acrylate in 60 minutes, and the combined mixture was further stirred for 60 minutes to obtain a dispersion of crosslinked polymer microparticles. The solid content of said dispersion was 30% and the mean diameter of the contained microparticles was 90 nm. By subjecting the said dispersion to a spray drying, amide group bearing crosslinked polymer microparticles were obtained.

EXAMPLE 6

Into a 1 liter reaction vessel fitted with a stirrer, a condenser and a thermoregulator, were placed 237 parts of deionized water, 15 parts of amphoionic group bearing emulsifier obtained in Reference Example 1 and 1.5 parts of dimethyl ethanolamine and the mixture was heated to 80° C. under stirring to obtain a clear solution. To this, were simultaneously and dropwise added a solution of 1 part of azobiscyanovaleric acid in 20 parts of deionized water added with 0.7 part of dimethyl ethanolamine, a solution of 1.1 parts of acrylamide in 8 parts of deionized water and a monomer mixture of 35 parts of styrene, 35 parts of ethyleneglycol dimethacrylate and 28.9 parts of n-butyl acrylate and the combined mixture was stirred for additional 60 minutes to obtain a dispersion of crosslinked polymer microparticles, the solid content being 30% and the mean diameter of the contained microparticles being 90 nm. By subjecting said dispersion to a spray drying, amide group bearing crosslinked polymer microparticles were obtained.

EXAMPLE 7

Into a glass vessel fitted with a thermometer, a reflux condenser, a nitrogen gas inlet tube and a stirrer, were placed 400 parts of deionized water, 25 parts of the emulsifier obtained in Reference Example 1 and 3.5 parts of dimethyl ethanolamine and the mixture was heated to 50° to 55° C. under stirring to obtain a clear solution. To this, were added 150 parts of Sumimal M-50W (melamine resin, trademark of Sumitomo Chem. Co.) and the mixture was, after stirring for 20 minutes, heated to 90° C. and reacted at the same temperature for 90 minutes to obtain an aqueous dispersion of crosslinked melamine resin microparticles. By subjecting the dispersion to a drying, crosslinked melamine resin microparticles having 5μ or less diameter were obtained.

Into the similar reaction vessel as stated hereinabove, were placed 60 parts of said melamine resin microparticles, 0.1 part of dibutyl tin dilaurate, 1 part of phenyl isocyanate and 140 parts of butyl acetate and the mixture was heated to 100° C. under stirring and maintained at the same temperature for 1 hour. After confirming the complete disappearance of NCO absorption band in an infra-red spectrophotometric analysis there was obtained a dispersion of urethane and urea groups bearing, crosslinked melamine resin microparticles in butyl acetate, the solid content being 30%.

EXAMPLE 8

Into a similar reaction vessel as used in Example 7, were placed 400 parts of deionized water, 25 parts of the emulsifier obtained in Reference Example 1 and 3.5 parts of dimethyl ethanolamine and the mixture was stirred at a room temperature to obtain a clear solution. To this, were added 120 parts of ERL-4221 (alicyclic epoxy resin, trademark of Union Carbide) and the mixture was stirred for 30 minutes. Next, 30 parts of triethylene tetramine were added thereto and the combined mixture was stirred for 40 minutes. The precipitated particles were separated, washed well with water to remove triethylene tetramine residue therefrom and dried. The dried agglomerated mass was pulverized in an atomizer, and thus obtained powder was sieved to obtain microparticles having a mean diameter of 5µ or less. Into a similar reaction vessel as stated hereinabove, were placed 60 parts of thus obtained polymer microparticles, 0.1 part of dibutyl tin dilaurate, 1.1 parts of phenyl isocyanate and 140 parts of butyl acetate, and the mixture was heated, under stirring, to 110° C. and reacted at the same temperature for 90 minutes. The completion of the reaction was confirmed by checking the disappearance of NCO absorption band in an infrared spectrophotometric analysis and a dispersion of urethane bearing crosslinked epoxy resin particles in butyl acetate was obtained, whose solid content was 30%.

EXAMPLE 9

Into a similar reaction vessel as used in Example 7, were placed 400 parts of deionized water, 120 parts of unsaturated polyester resin (reaction product of 295 parts of linseed fatty acid, 376 parts of trimethylol ethane, 289 parts of phthalic anhydride and 95 parts of maleic anhydride, number average molecular weight 1000, resinous acid value 50) and 5.7 parts of dimethylaminoethanol and the mixture was stirred at 50° to 55° C. to obtain an aqueous dispersion varnish. To this, 30 parts of styrene and 2 parts of t-butyl peroxy-2-ethyl hexanoate were added and after stirring for 20 minutes, the inner temperature was raised to 85° to 90° C. and the reaction was continued at the same temperature for 2 hours. Thus obtained crosslinked polyester resin particles were separated and dried to obtain the microparticles having a mean diameter of 1µ or less. Into a similar reaction vessel as stated hereinabove, were placed 60 parts of thus obtained microparticles, 0.1 part of dibutyl tin dilaurate, 1.5 parts of phenylisocyanate and 140 parts of toluene, and the combined mixture was heated to 110° C. and maintained at the same temperature for 2 hours. After confirming the complete disappearance of NCO absorption band in an infra-red spectrophotometric analysis, a toluene dispersion of urethane bearing crosslinked polyester resin microparticles was obtained. The solid content of said dispersion was 30%.

REFERENCE EXAMPLE 6

Preparation of comparative crosslinked polymer microparticles

Into a 1 liter reaction vessel fitted with a stirrer, a condenser and a thermoregulator, were placed 245 parts of deionized water, 15 parts of amphoionic group bearing emulsifier obtained in Reference Example 1 and 1.5 parts of dimethyl ethanolamine and the mixture was heated, under stirring, to 80° C. to obtain a clear solution. To this, were simultaneously and dropwise added a solution of 1 part of azobiscyanovaleric acid in 20 parts of deionized water added with 0.7 part of dimethyl ethanolamine and a monomer mixture of 35 parts of styrene, 35 parts of ethyleneglycol dimethacrylate and 30 parts of n-butyl acrylate in 60 minutes and the combined mixture was stirred for 90 minutes to obtain a dispersion of comparative crosslinked polymer microparticles, the solid content being 30% and the mean grain diameter being 90 nm. By subjecting the dispersion to a spray drying, the crosslinked polymer microparticles were obtained.

REFERENCE EXAMPLE 7

Preparation of acrylic resin varnish

Into a reaction vessel fitted with a stirrer, a thermometer, a reflux condenser, a nitrogen gas inlet tube and a dropping funnel, were placed 800 parts of xylene and 100 parts of n-butanol and while introducing nitrogen gas, the mixture was heated to 120° C. To this, at the same temperature, was dropwise added from the dropping funnel, a mixture of the following in 3 hours.

| styrene | 300 parts |
| --- | --- |
| 2-ethylhexyl methacrylate | 400 parts |
| 2-ethylhexyl acrylate | 107 parts |
| 2-hydroxyethyl methacrylate | 162 parts |
| methacrylic acid | 31 parts |
| azobisisobutyronirile | 20 parts |

After 30 minutes had elapsed from the completion of said addition, there was dropwise added a mixture of 5 parts of t-butyl peroxy-2-ethylhexanoate and 100 parts of xylene in 30 minutes and the combined mixture was subjected to aging for 1 hour 30 minutes and then allowed to cool to obtain an acrylic resin varnish having a solid content of 50%.

REFERENCE EXAMPLE 8

Preparation of acrylic resin varnish

Into a reaction vessel fitted with a stirrer, a thermometer, a reflux condenser, a nitrogen gas inlet tube and a dropping funnel, were placed 850 parts of xylene and 100 parts of n-butanol, and the mixture was heated, while introducing nitrogen gas, to 120° C., and there was dropwise added at the same temperature a mixture of the following:

| styrene | 300 parts |
| --- | --- |
| 2-ethylhexyl methacrylate | 400 parts |
| 2-ethylhexyl acrylate | 107 parts |
| 2-hydroxyethyl methacrylate | 162 parts |
| methacrylic acid | 31 parts |
| urethane bearing monomer obtained in Reference Example 4 | 50 parts |
| azobisisobutyronirile | 20 parts |

After 30 minutes had elapsed from the completion of said addition, a mixture of 5 parts of t-butyl peroxy-2-ethylhexanoate and 100 parts of xylene was dropwise added in 30 minutes and the combined mixture was aged for 90 minutes, and then allowed to cool to obtain urethane bearing acrylic resin varnish. The solid content of said varnish was 50%.

REFERENCE EXAMPLE 9

Into a reaction vessel fitted with a stirrer, a thermometer, a reflux condenser, a nitrogen gas inlet tube and a dropping funnel, were placed 850 parts of xylene and 100 parts of n-butanol and the mixture was heated, while introducing nitrogen gas, to 120° and there was dropwise added at the same temperature a mixture of the following:

| styrene | 300 parts |
| --- | --- |
| 2-ethylhexyl methacrylate | 400 parts |
| 2-ethylhexyl acrylate | 107 parts |

-continued

| | |
|---|---|
| 2-hydroxyethyl methacrylate | 162 parts |
| methacrylic acid | 31 parts |
| urea bearing monomer obtained in Reference Example 2 | 50 parts |
| azobisisobutyronitile | 20 parts |

After 30 minutes has elapsed from the completion of said addition, a mixture of 5 parts of t-butyl peroxy-2-ethylhexanoate and 100 parts of xylene was dropwise added in 30 minutes and the combined mixture was aged for 90 minutes and then allowed to cool to obtain a urea bearing acrylic resin varnish having a solid content of 50%.

REFERENCE EXAMPLE 10

Preparation of polyester resin varnish

Into a reaction vessel fitted with a stirrer, a thermoregulator and a decanter, were placed the following:

| | |
|---|---|
| ethyleneglycol | 39 parts |
| neopentylglycol | 130 parts |
| azelaic acid | 236 parts |
| phthalic anhydride | 186 parts |
| xylene | 30 parts | and the mixture was heated and stirred. Heating was continued, while removing the formed water azeotropically with xylene, until the resinous acid value reached 150. Thereafter, the reaction mixture was allowed to cool to 140° C., added with 314 parts of Cardura E-10 (epoxy resin, trademark of Shell Chem. Co.) and stirred for 2 hours to complete the reaction. Thus obtained product had an acid value of 9 and a hydroxyl value of 90 and number average molecular weight of the contained resin was 1050. The said product was diluted with xylene to a solid content of 60%. Thus, a polyester resin varnish having a Gardner viscosity of Y was prepared.

REFERENCE EXAMPLE 11

Preparation of polyester resin varnish

Into a reaction vessel fitted with a stirrer, a condenser and a thermoregulator, were placed 1667 parts of polyester resin varnish obtained in Reference Example 10, 1 part of dibutyl tin dilaurate, 25 parts of phenylisocyanate and 16 parts of xylene and the mixture was heated, under stirring, to 120° C. and maintained at the same temperature for 1 hour. After confirming the complete disappearance of NCO absorption band in an infra-red spectrophotometric analysis, a urethane bearing polyester resin varnish (solid content 60%) was obtained.

EXAMPLE 10

20 parts of urea bearing crosslinked polymer microparticles obtained in Example 1 were dispersed in a mixture of 42 parts of xylene, 30 parts of methyl isobutyl ketone and 8 parts of n-butanol. While stirring the same in a disper, 280 parts of the acrylic resin varnish obtained in Reference Example 7 and 120 parts of butylated melamine (U-van 20 SE-60, trademark of Mitsuitohatu Chem. Co.) were added and mixed well to obtain a clear coating composition. The said composition was adjusted with xylene to a viscosity which was optimum for spraying use (#4 Ford cup 25 sec.) and the thus diluted composition was applied onto a tin plate held vertically by an air spray gun so as to give a coating with 40μ thickness. After setting for 5 minutes, the coated plate was baked at 140° C. for 25 minutes. Thus obtained coating had a PGD value of 0.9, whose surface smoothness was excellent. PGD value was measured by Portable distinctness of Image Grossmeter manufactured by Nipon Shikisai Kenkyusho. The higher the value, the better the image sharpness.

EXAMPLES 11 TO 18

Similar experiments as stated in Example 10 were repeated excepting using the materials shown in the following Table 1. PGD value and surface smoothness of each coating are also shown in Table 1.

COMPARATIVE EXAMPLE 1

A similar experiment as stated in Example 10 was repeated excepting substituting the crosslinked polymer microparticles obtained in Reference Example 6 for the urea bearing crosslinked polymer microparticles of Example 1. PGD value and surface smoothness of thus obtained coating are shown in Table 1.

COMPARATIVE EXAMPLE 2

A similar experiment as stated in Example 15 was repeated excepting substituting the crosslinked polymer microparticles obtained in Reference Example 6 for the urea bearing crosslinked polymer microparticles of Example 2. PGD value and surface smoothness of thus obtained coating are shown in Table 1.

TABLE 1

| | polymer microparticles | organic solvent | melamine resin | acrylic resin | polyester resin | PGD | smoothness |
|---|---|---|---|---|---|---|---|
| Example | | | | | | | |
| 11 | urea bearing particles of Ex. 2: 20 parts | xylene/methyl isobutyl ketone/ n-butanol = 42/30/8 | U-van 20SE-60: 120 parts | Ref. Ex. 7: 280 parts | — | 0.9 | excellent |
| 12 | urethane bearing particles of Ex. 3: 20 parts | xylene/methyl isobutyl ketone/ n-butanol = 42/30/8 | U-van 20SE-60: 120 parts | Ref. Ex. 7: 280 parts | — | 0.8 | " |
| 13 | urethane bearing particles of Ex. 4: 20 parts | xylene/methyl isobutyl ketone/ n-butanol = 42/30/8 | U-van 20SE-60: 120 parts | Ref. Ex. 7: 280 parts | — | 0.8 | " |
| 14 | amino bearing particles of Ex. 5: 20 parts | xylene/methyl isobutyl ketone/ n-butanol = 42/30/8 | U-van 20SE-60: 120 parts | Ref. Ex. 7: 280 parts | — | 0.9 | " |
| 15 | urea bearing particles of | xylene/methyl isobutyl ketone/ | U-van 20SE-60: | Ref. Ex. 8: 280 parts | — | 1.0 | excellent |

TABLE 1-continued

|    | polymer microparticles | organic solvent | melamine resin | acrylic resin | polyester resin | PGD | smoothness |
|----|---|---|---|---|---|---|---|
|    | Ex. 2: 20 parts | n-butanol = 42/30/8 | 120 parts | | | | |
| 16 | urea bearing particles of Ex. 2: 20 parts | xylene/methyl isobutyl ketone/ n-butanol = 42/30/8 | U-van 20SE-60: 120 parts | Ref. Ex. 9: 280 parts | — | 1.0 | " |
| 17 | urea bearing particles of Ex. 1: 20 parts | xylene/methyl isobutyl ketone/ n-butanol = 42/30/8 | U-van 20SE-60: 120 parts | — | Ref. Ex. 10: 233 parts | 0.8 | " |
| 18 | urea bearing particles of Ex. 1: 20 parts | xylene/methyl isobutyl ketone/ n-butanol = 42/30/8 | U-van 20SE-60: 120 parts | — | Ref. Ex. 11: 233 parts | 0.9 | " |
| Comp. Example | | | | | | | |
| 1 | particles of Ex. 6: 20 parts | xylene/methyl isobutyl ketone/ n-butanol = 42/30/8 | U-van 20SE-60: 120 parts | Ref. Ex. 7: 280 parts | — | 0.6 | good |
| 2 | particles of Ex. 6: 20 parts | xylene/methyl isobutyl ketone/ n-butanol = 42/30/8 | U-van 20SE-60: 120 parts | Ref. Ex. 8: 280 parts | — | 0.6 | good |

What is claimed is:

1. An organic solvent coating composition consisting essentially of
(A) a film-forming polymer
(B) a volatile organic liquid diluent carried in the form of a solution or dispersion with said film-forming polymer, and
(C) crosslinked polymer microparticles which are insoluble in the combination of said film-forming polymer and diluent and stably dispersed therein, which crosslinked polymer microparticles have a mean grain diameter of 0.01 to 10μ, whose polymer carried urea groups, wherein the solid weight ratio of said (A): said (C) is 50 to 99.5:50 to 0.5.

2. The composition according to claim 1, wherein the crosslinked polymer microparticles are composed of a polymer selected from condensation polymers or addition polymers.

3. The composition according to claim 1, wherein the film-forming polymer is selected from the group consisting of acrylic resin, alkyd resin, oil-free polyester resin, and epoxy resin.

4. The composition according to claim 1, wherein the organic liquid diluent is selected from the group consisting of aromatic hydrocarbons, aliphatic hydrocarbons, alcohols, ethers, ketones and esters.

* * * * *